(12) United States Patent
Jiang et al.

(10) Patent No.: US 11,014,647 B2
(45) Date of Patent: May 25, 2021

(54) LOCKING MECHANISM, PROPELLER, MOTOR, PROPULSION SYSTEM ASSEMBLY, AND AIRCRAFT

(71) Applicant: SZ DJI TECHNOLOGY CO., LTD., Shenzhen (CN)

(72) Inventors: Bin Jiang, Shenzhen (CN); Tao Deng, Shenzhen (CN); Di Ou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 183 days.

(21) Appl. No.: 16/395,464

(22) Filed: Apr. 26, 2019

(65) Prior Publication Data

US 2019/0248471 A1    Aug. 15, 2019

Related U.S. Application Data

(63) Continuation of application No. PCT/CN2016/103737, filed on Oct. 28, 2016.

(51) Int. Cl.
*B64C 11/02* (2006.01)
*B64C 39/02* (2006.01)
(Continued)

(52) U.S. Cl.
CPC .............. *B64C 11/02* (2013.01); *A63H 27/12* (2013.01); *B64C 27/08* (2013.01); *B64C 39/024* (2013.01);
(Continued)

(58) Field of Classification Search
CPC ....... B64C 11/02; B64C 11/04; B64C 39/024; B64C 27/08; B64C 27/14; B64C 27/26;
(Continued)

(56) References Cited

U.S. PATENT DOCUMENTS 2,083,621 A * 6/1937 Smith ................ B65D 43/0231
229/125.23
2,847,240 A * 8/1958 Stone .................... E05C 19/066
292/70
(Continued)

FOREIGN PATENT DOCUMENTS

CN        202966659 U     6/2013
CN        103921937 A     7/2014
(Continued)

OTHER PUBLICATIONS

World Intellectual Property Organization (WIPO), International Search Report for PCT/CN2016/103737, dated Jul. 25, 2017, 5 Pages.

*Primary Examiner* — David E Sosnowski
*Assistant Examiner* — Wayne A Lambert
(74) *Attorney, Agent, or Firm* — Anova Law Group, PLLC

(57) ABSTRACT

A propulsion system assembly includes a propeller and a motor configured to drive the propeller to rotate. The propeller includes one of a first body and a second body. The motor comprises the other one of the first body and the second body. The propulsion system assembly also includes a locking mechanism configured to detachably connecting the first body and the second body. The locking mechanism includes a locking member and a position limiting lock catch. The locking member is configured to lock the first body and the second body. The locking member includes locking parts located at at least two sides of the locking member. When the locking parts of the locking member rotate to a locking position, the position limiting lock catch is mounted to a side of the locking parts, to restrain the locking member from rotating relative to the first body.

20 Claims, 13 Drawing Sheets

(51) Int. Cl.
  *A63H 27/00* (2006.01)
  *B64C 27/08* (2006.01)
(52) U.S. Cl.
  CPC .. *B64C 2201/024* (2013.01); *B64C 2201/027* (2013.01); *B64C 2201/042* (2013.01); *B64C 2201/108* (2013.01); *B64C 2201/20* (2013.01)
(58) Field of Classification Search
  CPC ... B64C 27/32; B64C 2201/20; B64C 27/024; B64C 27/027; B64C 27/042; B64C 27/108; B64D 27/26; B64D 27/12; F04D 29/20; Y10T 403/32319; Y10T 403/32401; Y10S 292/38; Y10S 292/63; Y10S 292/0894; Y10S 292/0895; Y10S 292/0902; Y10S 292/42; Y10S 292/438; Y10S 292/444; A63H 27/12
  USPC .................................................. 416/204 R
  See application file for complete search history.

(56) References Cited

U.S. PATENT DOCUMENTS

| | | | | |
|---|---|---|---|---|
| 3,797,870 A | * | 3/1974 | Beckman | E05C 3/14 70/84 |
| 3,850,464 A | * | 11/1974 | Bisbing | E05B 5/00 292/175 |
| 4,647,093 A | * | 3/1987 | Palsson | E05B 63/244 292/251 |
| 4,676,370 A | * | 6/1987 | Rudick | G11B 23/027 206/1.5 |
| 5,562,413 A | * | 10/1996 | Aihara | B63H 3/008 416/143 |
| 5,890,588 A | * | 4/1999 | Leonard | A47K 11/10 206/15.3 |
| 6,843,645 B2 | * | 1/2005 | Terada | F04D 29/426 417/273 |
| 7,500,829 B2 | * | 3/2009 | Edwards | F04D 29/026 416/170 R |
| 8,814,463 B2 | * | 8/2014 | Hallgren | F04D 29/20 403/374.4 |
| 10,737,774 B2 | * | 8/2020 | Goldstein | B64C 27/08 |
| 2004/0179942 A1 | * | 9/2004 | Newman | F04D 13/021 416/170 R |
| 2017/0240267 A1 | * | 8/2017 | Tao | B64C 11/04 |
| 2018/0208301 A1 | * | 7/2018 | Ye | B64C 11/10 |
| 2019/0039719 A1 | * | 2/2019 | Baek | B64C 11/04 |
| 2019/0256204 A1 | * | 8/2019 | Sun | B64C 11/04 |
| 2019/0263501 A1 | * | 8/2019 | Wang | B64C 11/04 |

FOREIGN PATENT DOCUMENTS

| | | | | |
|---|---|---|---|---|
| CN | 204279899 U | | 4/2015 | |
| CN | 204956919 U | | 1/2016 | |
| CN | 204998753 U | | 1/2016 | |
| CN | 105366041 A | | 3/2016 | |
| CN | 105517892 A | | 4/2016 | |
| CN | 205168894 U | | 4/2016 | |
| CN | 205273863 U | | 6/2016 | |
| CN | 205602090 U | | 9/2016 | |
| CN | 106043682 A | | 10/2016 | |
| CN | 106043682 A | * | 10/2016 | ......... F04D 29/2222 |
| CN | 106585977 A | * | 4/2017 | |
| CN | 106628165 A | * | 5/2017 | ............ B64C 27/04 |
| CN | 106672210 A | * | 5/2017 | |
| CN | 106828917 A | * | 6/2017 | |
| CN | 206218220 U | | 6/2017 | |
| CN | 206218221 U | | 6/2017 | |
| CN | 109398692 A | * | 3/2019 | ............ B64C 11/04 |
| EP | 2873614 A1 | | 5/2015 | |
| KR | 101528877 B1 | * | 6/2015 | |
| WO | WO-2011020136 A1 | * | 2/2011 | ......... F04D 29/2222 |
| WO | 2014141154 A1 | | 9/2014 | |
| WO | WO-2017049607 A1 | * | 3/2017 | ............ B64C 11/10 |
| WO | WO-2018086128 A1 | * | 5/2018 | ........... B64C 27/473 |

\* cited by examiner

LOCKING MECHANISM, PROPELLER, MOTOR, PROPULSION SYSTEM ASSEMBLY, AND AIRCRAFT

CROSS-REFERENCE TO RELATED APPLICATION

This application is a continuation application of International Application No. PCT/CN2016/103737, filed on Oct. 28, 2016, the entire contents of which are incorporated herein by reference.

TECHNICAL FIELD

The present disclosure relates to the technology field of aircrafts and, more particularly, to a locking mechanism, a propeller, a motor, a propulsion system assembly, and an aircraft.

BACKGROUND

A propeller generally includes a blade, a propeller hub for mounting the blade, and a motor coupled with the propeller hub. The motor drives the blade to rotate. Currently, the coupling between the propeller hub and a housing of the motor generally adopts a permanent fixing configuration, a threads tight fitting configuration, or a mechanical position limiting configuration.

When a permanent fixing configuration is used, and when the propeller needs to be transported, the propeller hub cannot be disassembled from the motor. As a result, the blade cannot be folded, causing inconvenience for transportation. Unfolded blade is also susceptible to damages. When a threads tight fitting configuration is used, and when the motor abruptly reduces its rotation speed, the blade may cause the propeller hub to disengage from a coupling interface with the motor due to the inertial of the blade, thereby causing the blade to be ejected (blade ejection).

When a mechanical position limiting configuration is used, during acceleration and deceleration movement processes, wear may be caused to the mechanical position limiting structure, thereby causing the blade to be ejected. In addition, the mechanical position limiting configuration generally needs to provide a threaded hole on the propeller hub and the motor, to couple with a screw for mounting the propeller hub on the motor. However, in high speed rotation, the screw may become loose, and therefore, may cause the blade and the propeller hub to fall off altogether.

SUMMARY

The present disclosure provides a locking mechanism, a propeller, a motor, a propulsion system assembly, and an aircraft.

According to a first aspect of the present disclosure, a propulsion system assembly is provided. The propulsion system assembly includes a propeller and a motor configured to drive the propeller to rotate. The propeller includes one of a first body and a second body. The motor includes the other one of the first body and the second body. The propulsion system assembly also includes a locking mechanism configured to detachably connecting the first body and the second body. The locking mechanism includes a locking member and a position limiting lock catch. The locking member is configured to lock the first body and the second body. The locking member includes locking parts located at at least two sides of the locking member. When the locking parts of the locking member rotate to a locking position, the position limiting lock catch is mounted to a side of the locking parts, to restrain the locking member from rotating relative to the first body.

According to a second aspect of the present disclosure, an aircraft is provided. The aircraft includes an aircraft body. The aircraft also includes propulsion system assembly. The propulsion system assembly includes a propeller and a motor configured to drive the propeller to rotate. The propulsion system assembly includes a locking mechanism configured to detachably lock the propeller to the motor. The propeller includes one of a first body and a second body, and the motor includes the other one of the first body and the second body. The locking mechanism is configured to detachably connect the first body and the second body. The locking mechanism includes a locking member and a position limiting lock catch. The locking member is configured to lock the first body and the second body. The locking member includes locking parts located at at least two sides of the locking member. When the locking parts of the locking member rotate to a locking position, the position limiting lock catch is mounted to a side of the locking parts, to restrain the locking member from rotating relative to the first body.

As can be seen from the technical solutions provided by embodiments of the present invention, the present invention provides a locking member, which can restrain the first body and the coupling member from falling apart from the second body due to the fastener becoming loose. As a result, the risk of blade ejection is reduced for the blade connected to the first body or the second body. In addition, the present disclosure provides a position limiting structure of the first body that is configured to block a free end or a position limiting lock catch, which can facilitate locking of the first body with the second body, thereby avoiding blade ejection caused by the first body falling apart from the second body.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

LABEL LIST OF THE DRAWINGS

Figure 1:
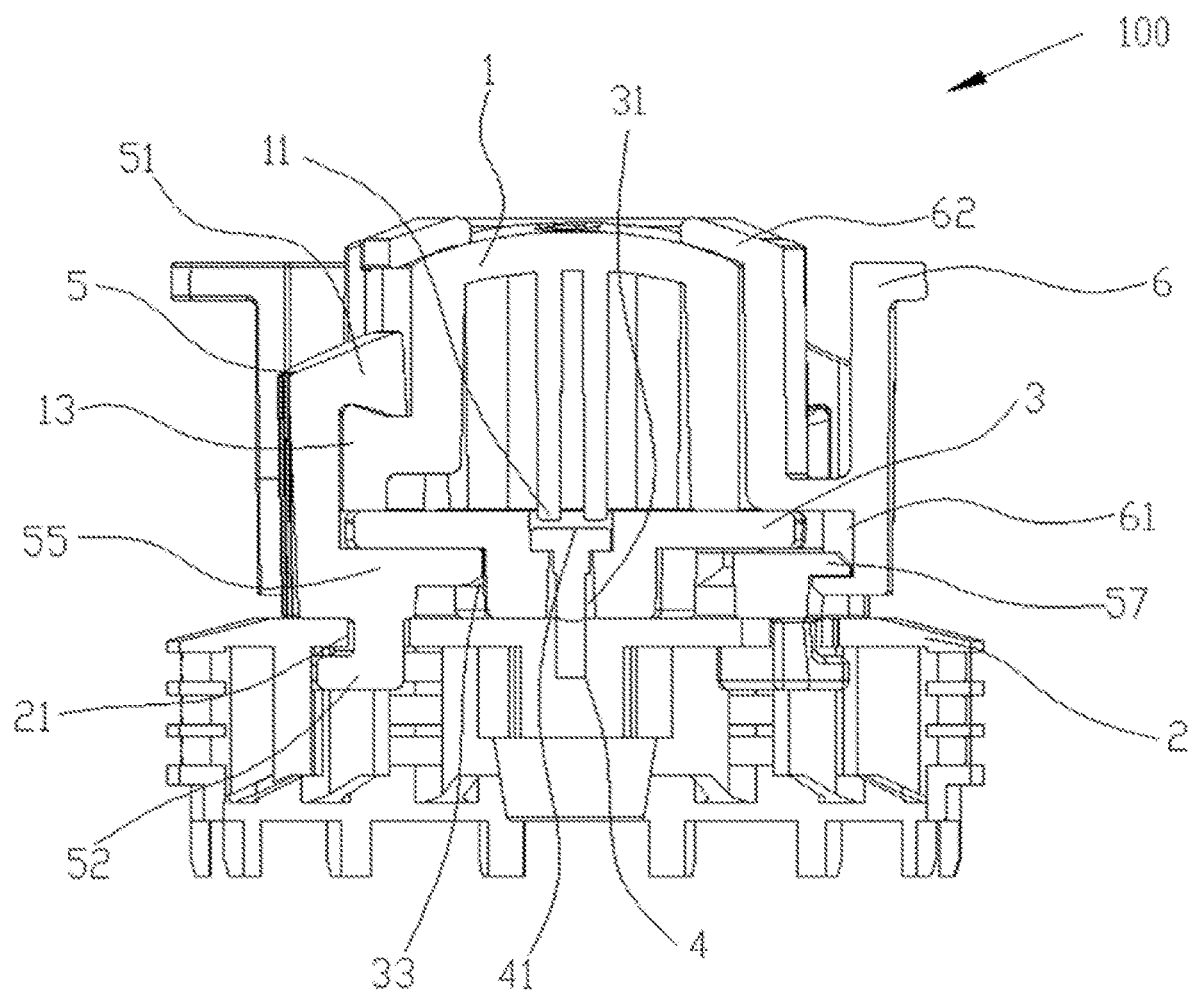
FIG. 1 is a schematic cutaway view of an assembled portion of a propulsion system assembly, illustrating the assembling position relationship among various parts, according to an example embodiment.

100: propulsion system assembly; 200: aircraft body; 1: first body; 11: blocking member; 12: protruding rib; 13: first raised portion; 2: second body; 21: second raised portion; 3: coupling member; 31: second threaded hole; 32: femoral position groove; 33: receiving space; 4: fastener; 41: free end; 5: locking member; 50: locking part; 51: first lock catch end; 52: second lock catch end; 53: first groove; 54: second groove; 55: third lock catch end; 56: protrusion; 57: position limiting block; 58: blocking boss; 6: position limiting lock catch; 61: position limiting groove; 62: connecting arm; 63: operating member; 64: opening part; 65: connecting block; 66: position limiting boss; 67: reinforcing rib; 7: blade; A: driving shaft; B: driving groove.

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure. In addition, when there is no obvious conflict, the following embodiments and the features included in the embodiments can be combined.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed. The term "communicatively coupled" indicates that related items are coupled or connected through a communication chancel, such as a wired or wireless communication channel.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

FIG. 1 is a cutaway view of a portion of a propulsion system assembly 100. As shown in FIG. 1, an embodiment of the present disclosure provides a locking mechanism for detachably locking a propeller with a motor, and for locking a first body 1 with a second body 2. In some embodiments, the first body 1 may be a propeller hub of the propeller, an outer rotor of the motor, or an adapter provided on the outer rotor of the motor. The second body 2 may be the propeller hub of the propeller, the outer rotor of the motor, or the adapter.

The locking mechanism may include a coupling member 3, a fastener 4 for fixing the coupling member 3 with the second body 2, and a locking member 5 for locking the first body 1 with the coupling member 3 and the second body 2. A bottom portion of the first body 1 that contacts the coupling member 3 can block a free end 41 of the fastener 4. The coupling member 3 may be disposed between the first body 1 and the second body 2, and may function as an intermediate connecting member to couple the first body 1 with the second body 2.

In the disclosed structures, the first body 1 may include a blocking member 11 disposed at a bottom portion of the first body 1 that contacts the coupling member 3 and extending from the bottom portion. The coupling member 3 may include a femoral position groove 32 (shown in FIG. 4). A bottom portion of the first body 1 that contacts the coupling member 3 may be provided with a protruding rib 12 configured to fit with the femoral position groove 32, to block the first body 1 from rotating relative to the coupling member 3. The protruding rib 12 may fit with the femoral position groove 32, thereby increasing the fitting surfaces and reducing the empty space between the first body 1 and the coupling member 3. This design may also reduce the wear caused by the first body 1 rotating relative to the coupling member 3, thereby prolonging the operation life of the first body 1. In addition, the fitting between the protruding rib 12 and the femoral position groove 32 can increase the stability of connection between the first body 1 and the coupling member 3 and the precision of the fitting between the first body 1 and the coupling member 3. As a result, torque transfer between the first body 1 and the coupling member 3 becomes more stable, and the transfer effect is enhanced.

Figure 3:
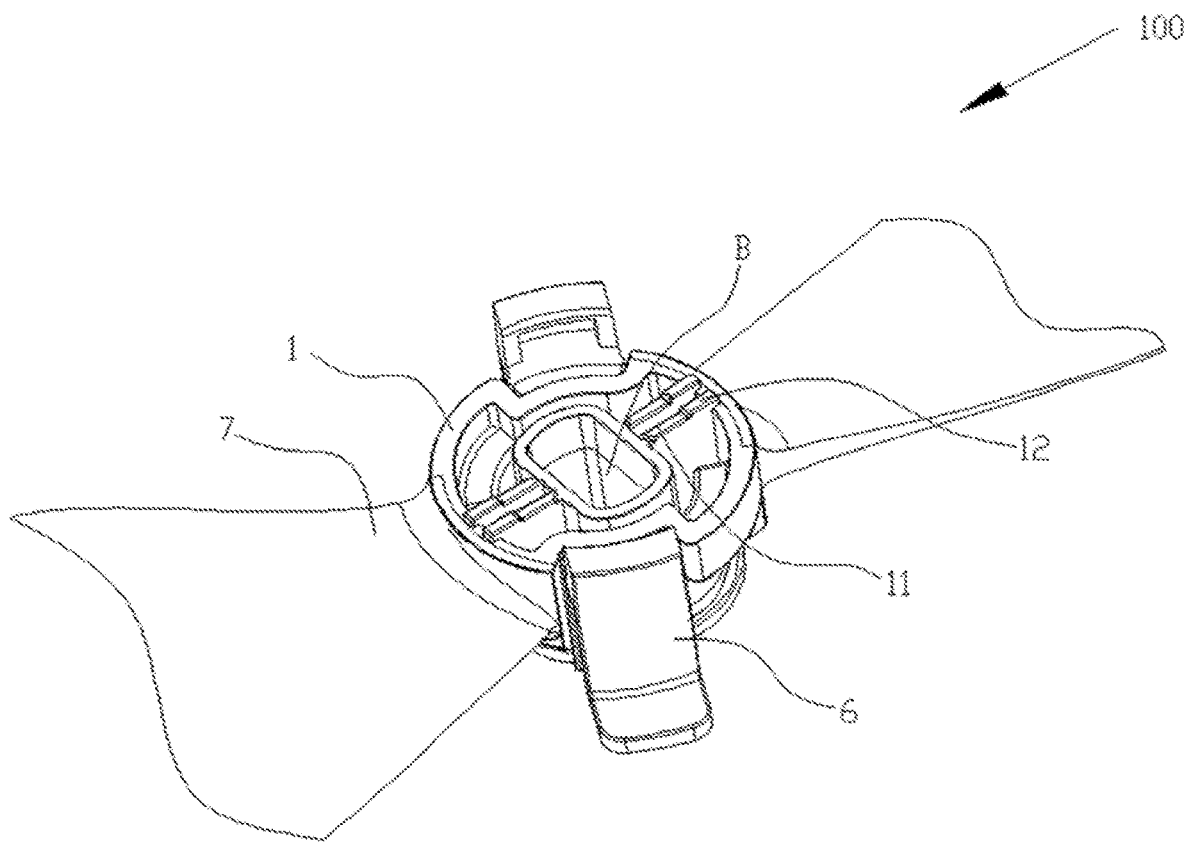
FIG. 3 is a three-dimensional view of an assembled portion of the propulsion system assembly, according to an example embodiment.

In some embodiments, as shown in FIG. 3, the protruding rib 12 and the blocking member 11 may be integrally provided, making the structure simpler.

Referring back to FIG. 1, a first threaded hole (not labeled in the figure) may be provided in the second body 2 to fit with the fastener 4. The coupling member 3 may be provided with a second threaded hole 31 configured to fit with the fastener 4. The first threaded hole and the second threaded hole 31 may face each other vertically. When the fastener 4 is inserted into the first threaded hole and the second threaded hole 31, the coupling member 3 may be fixed to the second body 2.

The fastener 4 may include a free end 41 located at an opening of the second threaded hole 31. The fastener 4 may be a threaded fastener (e.g., a screw, a bolt, etc.), a snap fit, or a positioning rod, which are quick-release members. In some embodiments, the fastener 4 may be a screw. The free end 41 may be a head of the screw.

To securely connect the coupling member 3 and the second body 2, multiple locations of the coupling member 3 and the second body 2 may be fastened together. In some embodiments, two fasteners 4 may be provided to fasten together the coupling member 3 and the second body 2 at different locations.

The blocking member 11 may be disposed at an opening location of the second threaded hole 31 to block the free end 41 of the fastener 4, thereby restraining the fastener 4 from falling out from the opening of the second threaded hole 31. By providing the blocking member 11, the opening of the second threaded hole 31 is limited, thereby restraining the threaded fastener 4 from existing from the second threaded hole 31. As a result, the coupling member 3 is restrained from falling apart from the second body 2, thereby reducing the risk of blade ejection.

In some embodiments, a distance between a bottom portion of the blocking member 11 and the free end 41 of the fastener is smaller than a depth the threaded fastener may insert into the first threaded hole. For example, the depth the threaded fastener may be inserted into the first threaded hole may be 2 cm, and the distance between the bottom portion of the blocking member 11 and the free end of the threaded fastener may be set as 50 mm. Then, if the threaded fastener becomes loose, because of the blocking function provided by the blocking member 11, the free end 41 of the threaded fastener is limited to be under the blocking member 11. Thus, the threaded fastener cannot entirely exit from the threaded hole 31, thereby restraining the coupling member 3 from separating from the second body 2.

In some embodiments, the bottom portion of the blocking member 11 is configured to directly abut against the free end 41 of the threaded fastener to limit the moving space of the threaded fastener. Thus, the threaded fastener cannot exit from the threaded hole 31. As a result, the coupling member 3 can be more securely fixed to the second body 2.

Figure 4:
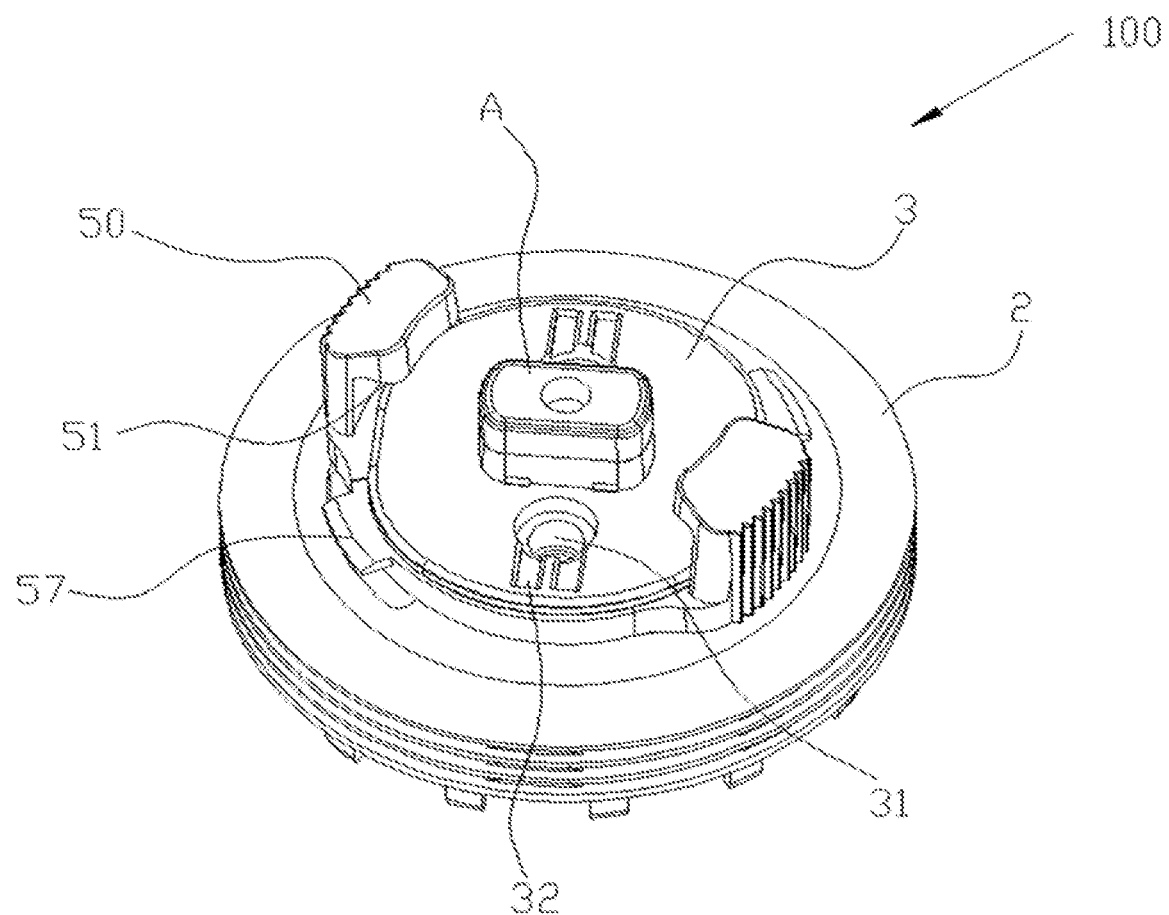
FIG. 4 is a three-dimensional view of an assembled portion of the propulsion system assembly viewed from another perspective, according to an example embodiment.

As shown in FIG. 3 and FIG. 4, the blocking member 11 may include two raised portions disposed apart by a predetermined distance, to block the free end 41 of the threaded fastener at different locations, thereby restraining the threaded fastener from exiting the threaded hole 31 from different locations. Correspondingly, there are two protruding ribs 12, protruding from the raised portions and are integrally formed with the raised portions in one-to-one correspondence.

The femoral position groove 32 may be disposed aside the second threaded hole 31. To fit with the two protruding ribs 12, the second threaded hole 31 may include two corresponding femoral position grooves 32.

Figure 5:
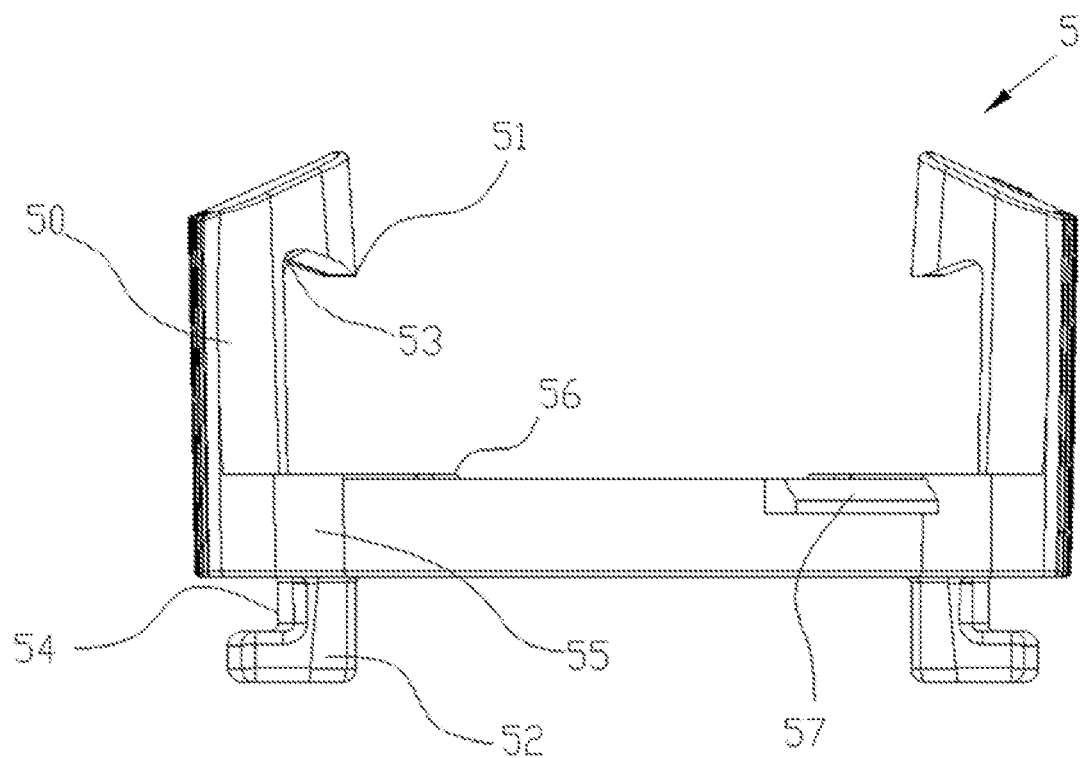
FIG. 5 is a three-dimensional view of a locking member, according to an example embodiment.

As shown in FIG. 5, the locking member 5 may include locking parts 50 located at at least two sides of the locking member 5, through which the locking member 5 can lock the first body 1 and the coupling member 3 with the second body 2 from at least two locations and/or directions. As a result, the locking between the first body 1, the coupling member 3 and the second body 2 becomes more reliable.

Each of the locking parts 50 may include a first lock catch end 51 configured to lock the first body 1, a second lock catch end 52 configured to lock the second body 2, and a third lock catch end 55 configured to lock the first body 1 and the coupling member 3.

In some embodiments, the first lock catch end 51 and the second lock catch end 52 are located at an upper end and a lower end of the locking part 50, respectively. The third lock catch end 55 may be disposed between the first lock catch end 51 and the second lock catch end 52.

The first lock catch end 51 may lock the first body 1 from the upper portion of the locking part 50. As shown in FIG. 1 and FIG. 5, the first lock catch end 51 may be provided with a first groove 53. The first body 1 may be provided with a first raised portion to fixedly fit with the first groove 53. When the first raised portion 13 is inserted into the first groove 53, the first raised portion 13 may be fixedly connected with the first groove 53, thereby fixedly locking the first body 1 with the locking member 5. Furthermore, with the fixed fitting configuration, the first raised portion 13 cannot rotate relative to the first groove 53, thereby restraining the locking member 5 from rotating relative to the first body 1 and reducing the wear to the locking member 5 due to rotation. As a result, the operation life of the locking member 5 may be prolonged.

The second lock catch end 52 may be configured to fixedly lock the second body 2 at the lower portion of the locking part 50. As shown in FIG. 1 and FIG. 5, the second lock catch end 52 may be provided with a second groove 54. The second body 2 may be provided with a second raised portion 21 configured to slidably fit with the second groove 54. By position limiting using the second groove 54 and the second raised portion 21, the second body 2 may be fixedly locked with the locking member 5. As a result, even if the fastener 4 becomes loose and exits completely, by position limiting through the second groove 54, the second groove 54 may tightly pull the second raised portion 21, thereby restraining the locking member 5 from being separated from the second body 2, which in turn restrains the first body 1 and the coupling member 3 from falling apart from the second body 2. In addition, the sliding fit (i.e., the clearance fit) configuration between the second groove 54 and the second raised portion 21 may enable the locking member 5 to rotate relative to the second body 2 after the locking member 5 locks the second body 2. As a result, the locking member 5 may synchronously rotate with the blade 7, thereby restraining the blade 7 from colliding with the locking member 5 during rotation.

In some embodiments, openings of the first groove 53 and the second groove 54 may have opposite directions. The first groove 53 may apply a downward pressing force on the first body 1, and the second groove 54 may apply an upward pulling force on the second body 2, thereby enabling the locking part 50 to lock the first body 1 and the second body 2 tightly. As a result, blade ejection due to the first body 2 being separated from the second body 1 can be avoided.

As seen in FIG. 1 and FIG. 5, the third lock catch end 55 may be provided with a protrusion 56 configured to abut with the coupling member 3 to further lock the first body 1 and the coupling member 3, thereby restraining, from multiple locations and/or directions, the first body 1 from being separated from the coupling member 3. As shown in FIG. 1, to lock the first body 1 and the coupling member 3, the coupling member 3 may be provided with a receiving space 33 for receiving the protrusion 56.

As shown in FIG. 1, FIG. 6, FIG. 9, and FIG. 10, the locking mechanism may also include a position limiting groove 61, a connecting arm 62, and an operating member 63. In the disclosed structures, the position limiting groove 61 may be located at a lower end of the connecting arm 62, and the operating member 63 may be located at an upper end of the connecting arm 62.

When the locking part 50 (or locking parts 50) of the locking member 5 rotates to a locking position (or locking positions), the position limiting lock catch 6 may be mounted to a side of the locking part 50, to restrain the locking member 5 from rotating relative to the first body 1, thereby assisting a user in determining whether the locking member 5 has been placed in a locking position, and whether the blade 7 has been installed completely or properly. The disclosed structures can also restrain the locking member 5 from rotating relative to the first body 1 caused by the locking member 5 not being tightly locked, thereby avoiding wear to the locking member 5 that would render the locking member 5 ineffective, which may result in blade ejection.

In some embodiments, the locking member 5 may be provided with a position limiting block 57 configured to snap fit with the position limiting groove 61. With the snap fit configuration, the position limiting lock catch 6 may have advantages such as convenient installation, simple disassembling, and easy replacement.

To assist a user in determining whether the locking member 5 has rotated to a locking position, and determining whether the blade has been properly installed, the location of the position limiting blocks 57 does not coincide with the locations of the locking parts 50.

In some embodiments, the position limiting block 57 may be disposed between the two locking parts 50. For example, the position limiting block 7 may be disposed on a side of the locking parts 50 distant from the blade 7. In some embodiments, the locking state of the blade 7 may be determined based on the position or location relationship between the position limiting lock catch 6, the position limiting block 57, and the locking parts 50.

Figure 10:
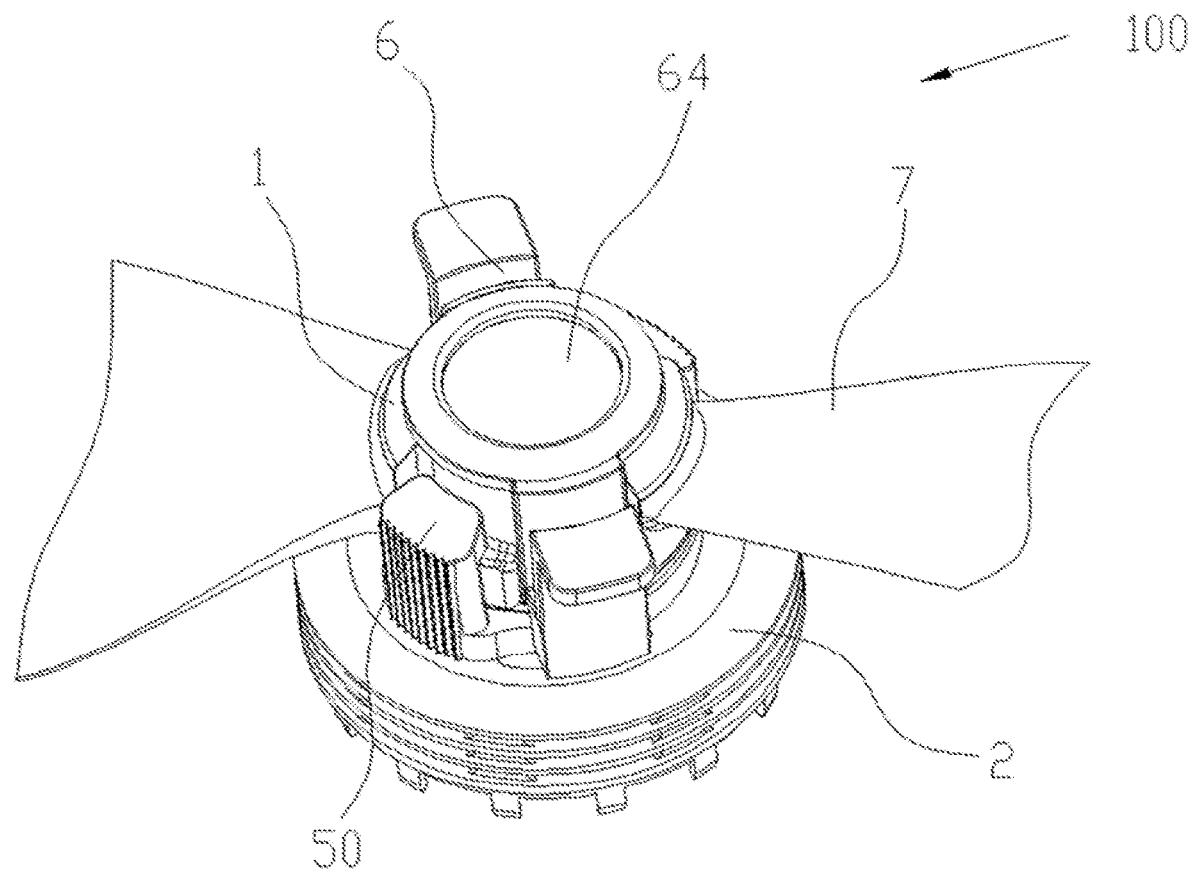
FIG. 10 is a perspective view of an overall assembled propulsion system assembly, illustrating the assembling position relationship among various parts, according to an example embodiment.

As shown in FIG. 4 and FIG. 10, the position limiting block 57 and the locking part 50 may be disposed in pairs. Correspondingly, the position limiting groove 61 and the position limiting block 57 may be disposed in pairs. Accordingly, the locking state of the locking member 5 can be determined from multiple aspects.

Figure 6:
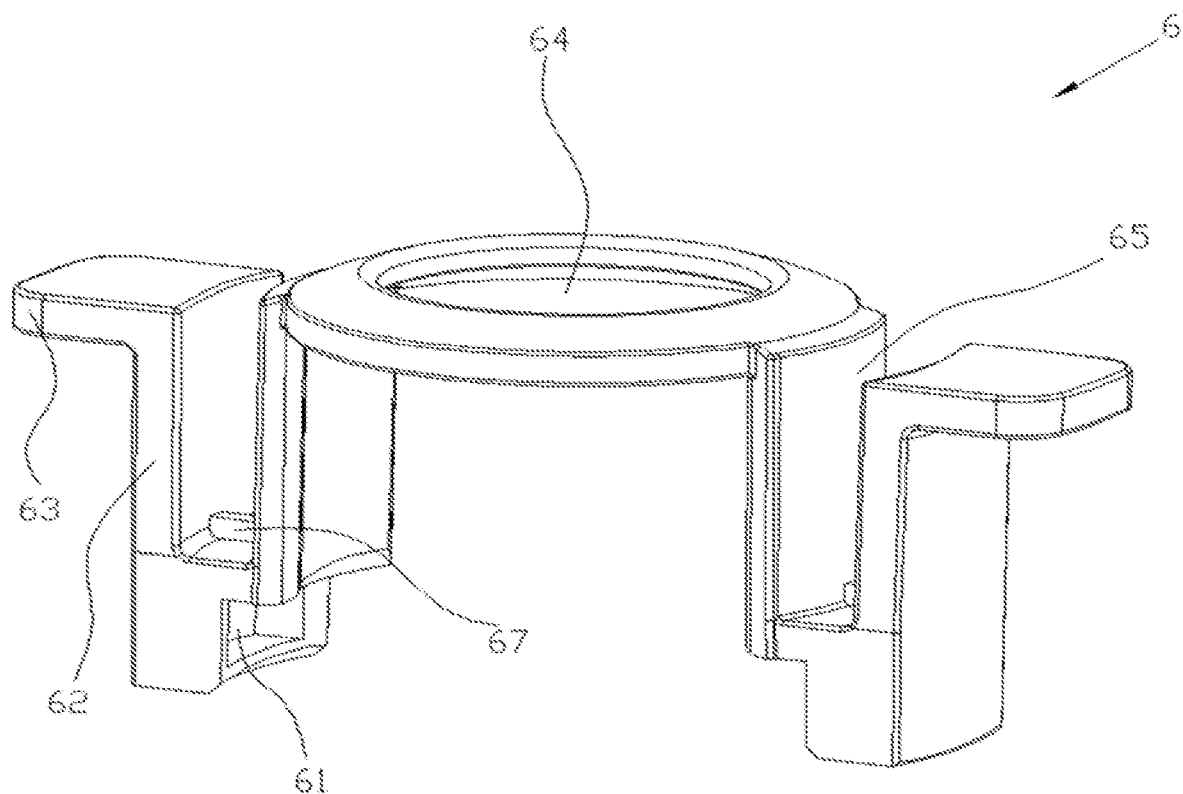
FIG. 6 is a three-dimensional view of a position limiting lock catch, according to an example embodiment.

As shown in FIG. 6, the position limiting groove 61, the connecting arm 62, and the operating member 63 are disposed correspondingly. In addition, corresponding to the locking parts 50, the position limiting lock catch 6 may include at least two groups of position limiting grooves 61, connecting arms 62, and operating members 63.

In some embodiments, the disclosed structure enables a user to conveniently disassemble blade 7 for easy transportation. For example, a user may press the operating member 63 to eject the position limiting lock catch 6 from the position limiting block 57. The position limiting lock catch 6 may be made of an elastic material, such as plastics, which can shrink, making it easier to eject the position limiting lock catch 6 from the position limiting block 57.

In some embodiments, the position limiting lock catch 6 may be independently disposed, making it convenient to disassemble and replace.

As shown in FIG. 6, the position limiting lock catch 6 may include an open portion 64 configured to fit with a top portion of the first body 1. For example, the open portion 64 may be sleeve coupled at the top portion of the first body 1 to fasten the first body 1, thereby restraining the first body 1 from rotating relative to the locking member 5 and the coupling member 3.

In some embodiments, two sides of the open portion 64 are provided with downwardly extended connecting blocks 65. A bottom portion of each connecting block 65 may be connected with the connecting arm 62.

In some embodiments, a reinforcing rib 67 may be provided between the connecting arm 62 and the connecting block 65 to restrain damages to the connecting arm 62 caused by excessive forces pressing the operating member 63.

In some embodiments, when disassembling the position limiting lock catch 6, a user may simultaneously apply a force on the two operating members 63 toward the open portion 64. Due to the elasticity of the position limiting lock catch 6, the two connecting arms 62 may shrink toward the open portion 64. Furthermore, the two position limiting grooves 61 may exit from the corresponding position limiting blocks 57. Thus, the user may disassemble the position limiting lock catch 6 entirely. The disclosed structures are simple and easy to operate.

Figure 7:
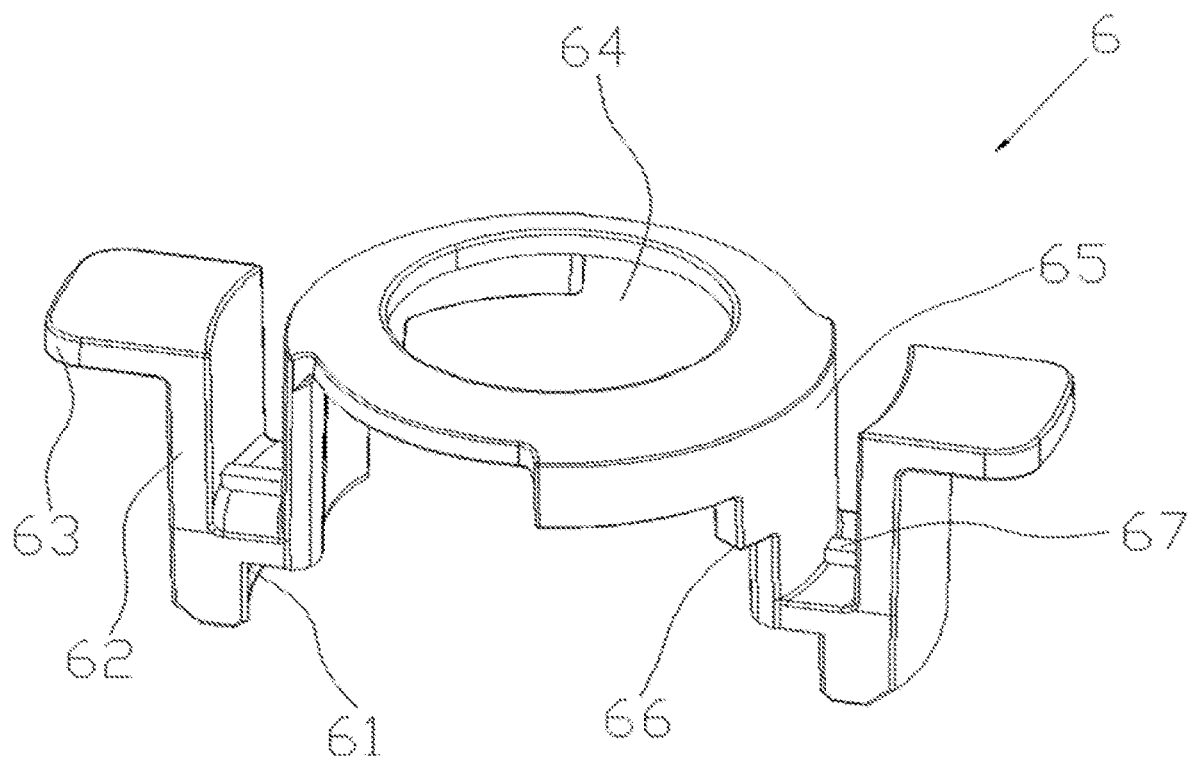
FIG. 7 is a three-dimensional view of a position limiting lock catch, according to another example embodiment.
Figure 8:
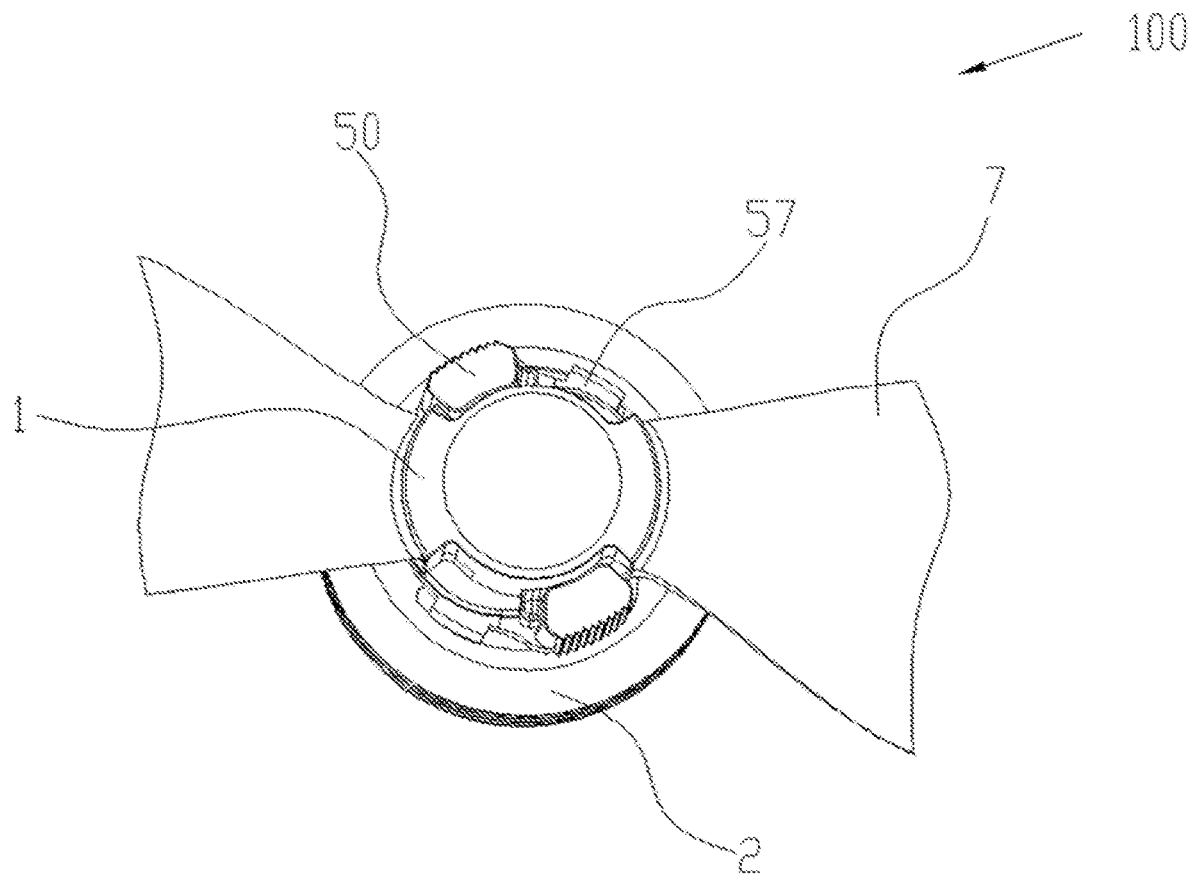
FIG. 8 is a three-dimensional view of a portion of the propulsion system assembly, illustrating a blade in a locked state, according to an example embodiment.
Figure 9:
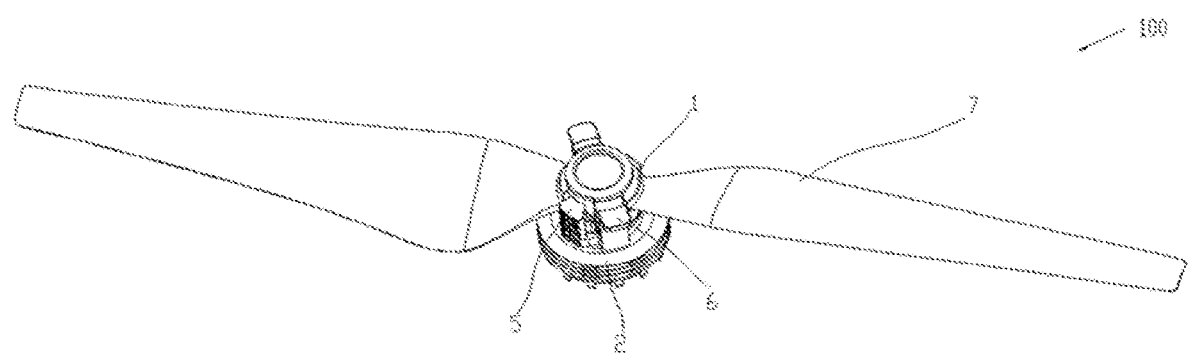
FIG. 9 is a perspective view of an overall assembled propulsion system assembly, according to an example embodiment.
Figure 11:
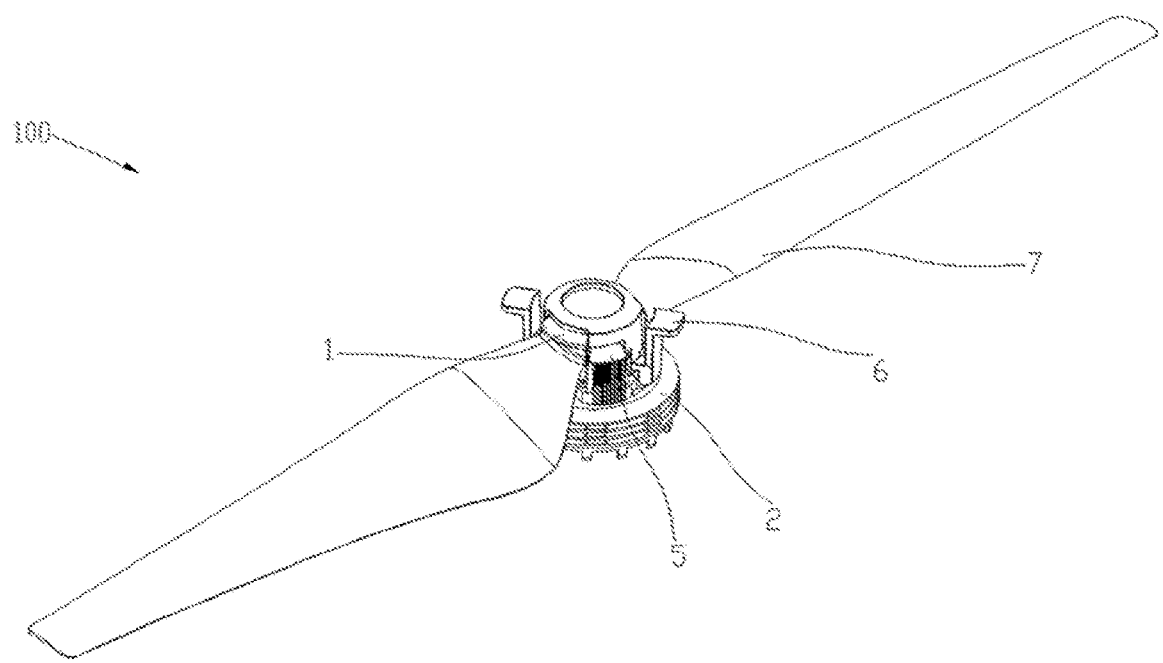
FIG. 11 is a perspective view of an overall assembled propulsion system assembly, according to another example embodiment.
Figure 12:
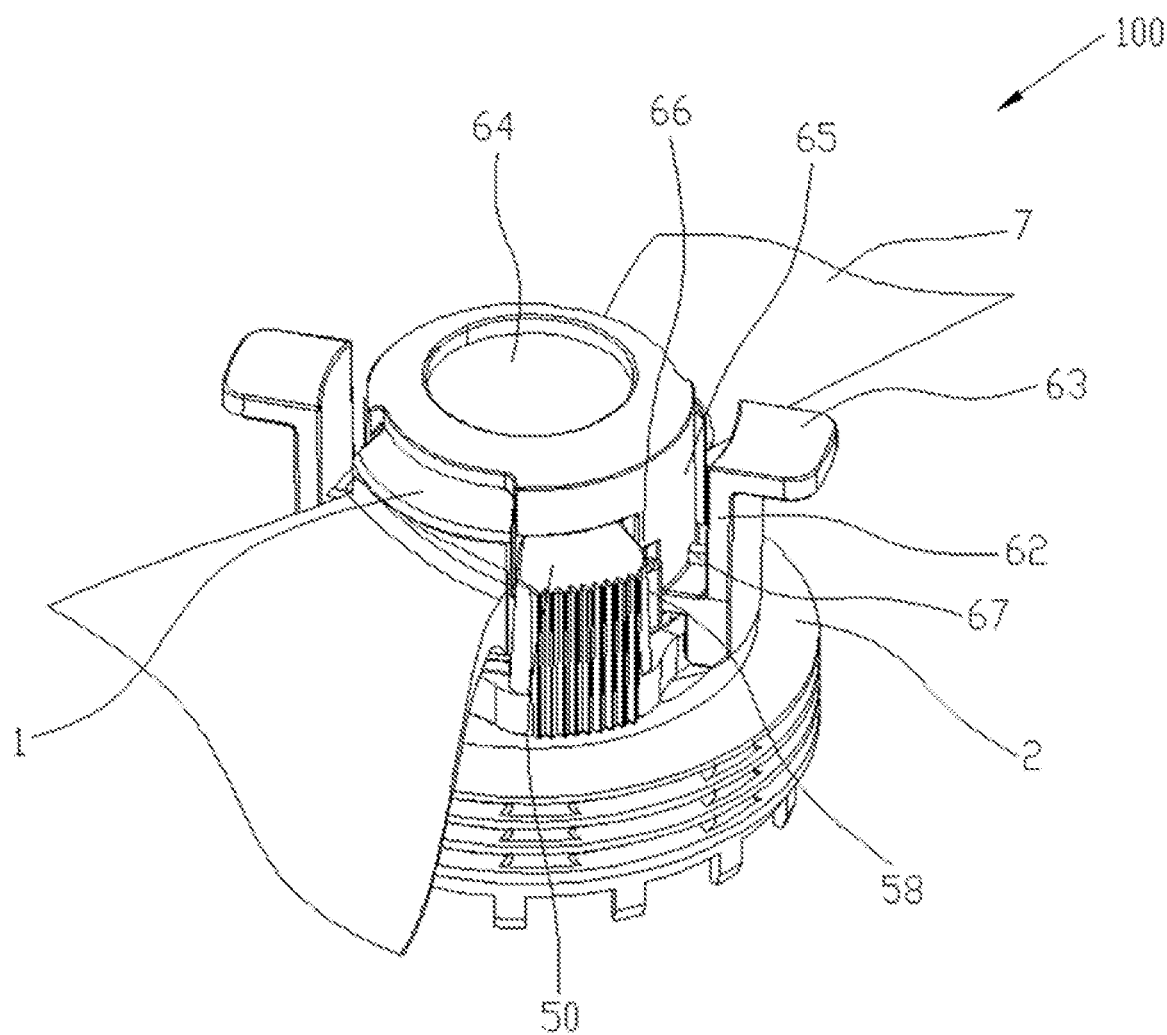
FIG. 12 is a perspective view of an overall assembled propulsion system assembly, illustrating the assembling position relationship among various parts, according to another example embodiment.

In some embodiments, as shown in FIG. 7, FIG. 11, and FIG. 12, the position limiting lock catch 6 may include a position limiting boss 66. The position limiting boss 66 may be configured to connect with a connecting block 65.

When the locking parts 50 of the locking member 5 rotate to the locking position, the position limiting boss 66 may block the locking parts 50 from a side of the locking parts 50, restraining the locking member 5 from rotating relative to the first body 1.

In some embodiments, the position limiting boss 66, the connecting block 65, and the open portion 64 may be integrally formed, rendering the structure of the position limiting lock catch 6 simple.

As shown in FIG. 7 and FIG. 12, the position limiting boss 66 may have a step shape, which may include a first step surface (not labeled in the figure) and a second step surface (not labeled in the figure). The first step surface and a lower surface of the open portion 64 may form a first position limiting space. The second step surface and the connecting block 65 may form a second position limiting space.

When the locking part 50 (or locking parts 50) of the locking member 5 rotates to a locking position (or locking positions), the first lock catch end 51 of the locking part 50 may be restrained within the first position limiting space to limit the position of the locking member 5, thereby restraining the locking member 5 from rotating relative to the first body 1. The disclosed structures may reduce the wear to the locking member 5, thereby prolonging the operation life of the locking member 5.

A blocking boss 58 may be provided on a side of the locking part 50 that faces the position limiting boss 66. When the locking part 50 (or locking parts 50) of the locking member 5 rotates to a locking position (or locking positions), the blocking boss 58 may be restrained within the second position limiting space, thereby limiting the position of the locking member 5. The disclosed structures may avoid wear to the locking member 5 caused by the rotation of the locking member 5 relative to the first body 1, thereby prolonging the operation life of the locking member 5.

Figure 2:
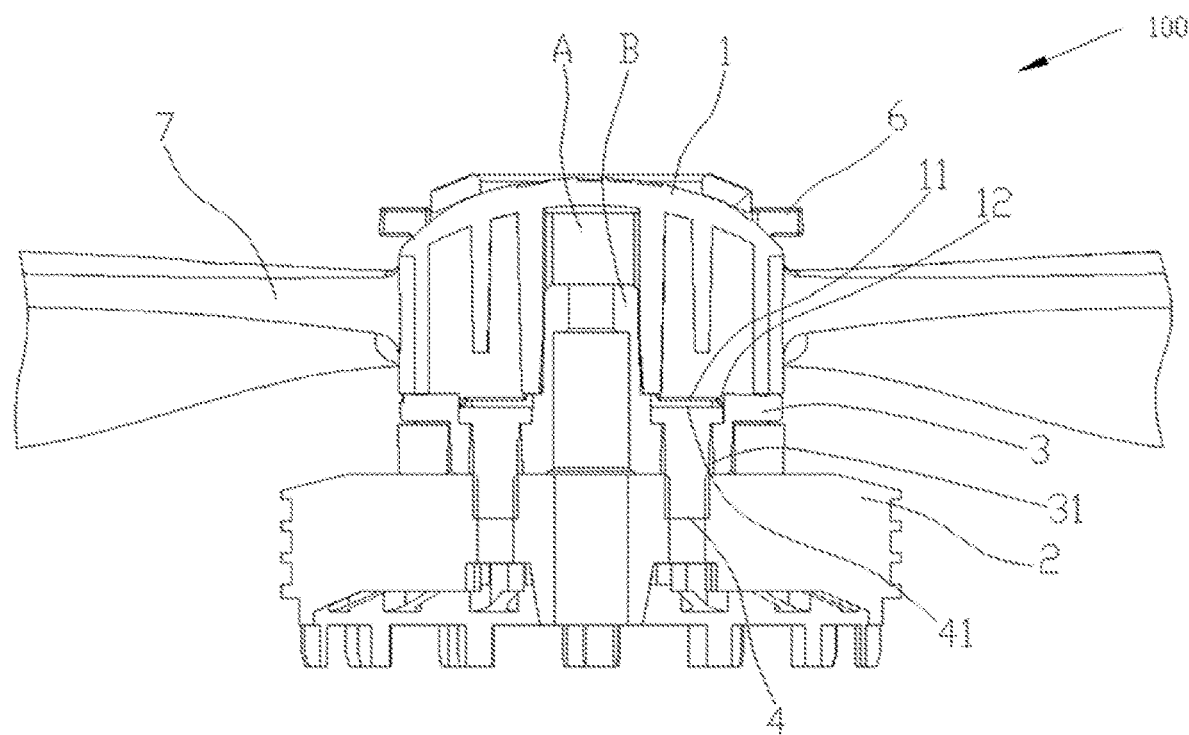
FIG. 2 is a schematic cutaway view of an assembled portion of the propulsion system assembly, illustrating the assembling position relationship among various parts, according to an example embodiment.

As shown in FIG. 2, an embodiment of the present disclosure provides a propeller, including a propeller hub, the blade 7 connected with the propeller hub, and the locking mechanism disclosed herein. In the disclosed structures, the locking mechanism may be configured to detachably lock the propeller hub with the motor.

In some embodiments, as shown in FIG. 2 and FIG. 3, the first body 1 may be the propeller hub, the second body 2 may be an outer rotor of the motor or an adapter provided on the outer rotor of the motor. The propeller hub may be detachably mounted to the motor through the locking mechanism disclosed herein.

In some embodiments, the second body 2 may be the propeller hub. The first body 1 may be the outer rotor of the motor, or an adapter disposed on the outer rotor of the motor. The propeller hub may be detachably mounted to the motor through the locking mechanism disclosed herein.

As shown in FIG. 1 and FIG. 2, an embodiment of the present disclosure provides a motor including an outer rotor, an inner rotor, and a locking mechanism disclosed herein. In the disclosed structures, the locking mechanism may be configured to detachably lock the propeller with the outer rotor.

In some embodiments, the first body 1 may be the outer rotor or an adapter provided on the outer rotor. The second body 2 may be the propeller hub of the propeller. In the disclosed structures, the adapter may be disposed on the outer rotor of the motor, or disposed on a rotating shaft of an inner rotor of the motor. The propeller may be detachably mounted to the outer rotor of the motor through the locking mechanism disclosed herein.

In some embodiments, as shown in FIG. 1 and FIG. 2, the second body 2 may be the outer rotor or the adapter provided on the outer rotor. The first body 1 may be the propeller hub of the propeller. In the disclosed structures, the adapter may be provided on the outer rotor of the motor or disposed on a rotating shaft of an inner rotor of the motor. The propeller may be detachably disposed on the outer rotor of the motor through the locking mechanism disclosed herein.

As shown in FIG. 2, an embodiment of the present disclosure provides a propulsion system assembly, including the propeller and the motor configured to drive the propeller to rotate. A propulsion system assembly 100 may include the locking mechanism disclosed herein.

In some embodiments, the motor may include the outer rotor. The propeller may include the propeller hub and the blade 7 connected with the propeller hub.

In some embodiments, as shown in FIG. 2, the first body 1 is the propeller hub of the propeller, and the second body 2 is the outer rotor of the motor, or the adapter disposed on the outer rotor of the motor. In the disclosed structures, the adapter may be disposed on the outer rotor of the motor, or may be fixedly connected to the rotating shaft of an inner rotor of the motor.

In some embodiments, the second body 2 is the propeller hub of the propeller, and the first body 1 is the outer rotor of the motor or the adapter disposed on the outer rotor of the motor. In the disclosed structures, the adapter may be disposed on the outer rotor or may be fixedly connected to the rotating shaft of an inner rotor of the motor.

The motor may include a driving shaft A, as shown in FIG. 3 and FIG. 4. The driving shaft A of the motor may protrude from the coupling member 3. The propeller hub may include a driving groove B configured to fit with the driving shaft A to provide propulsion forces.

Figure 13:
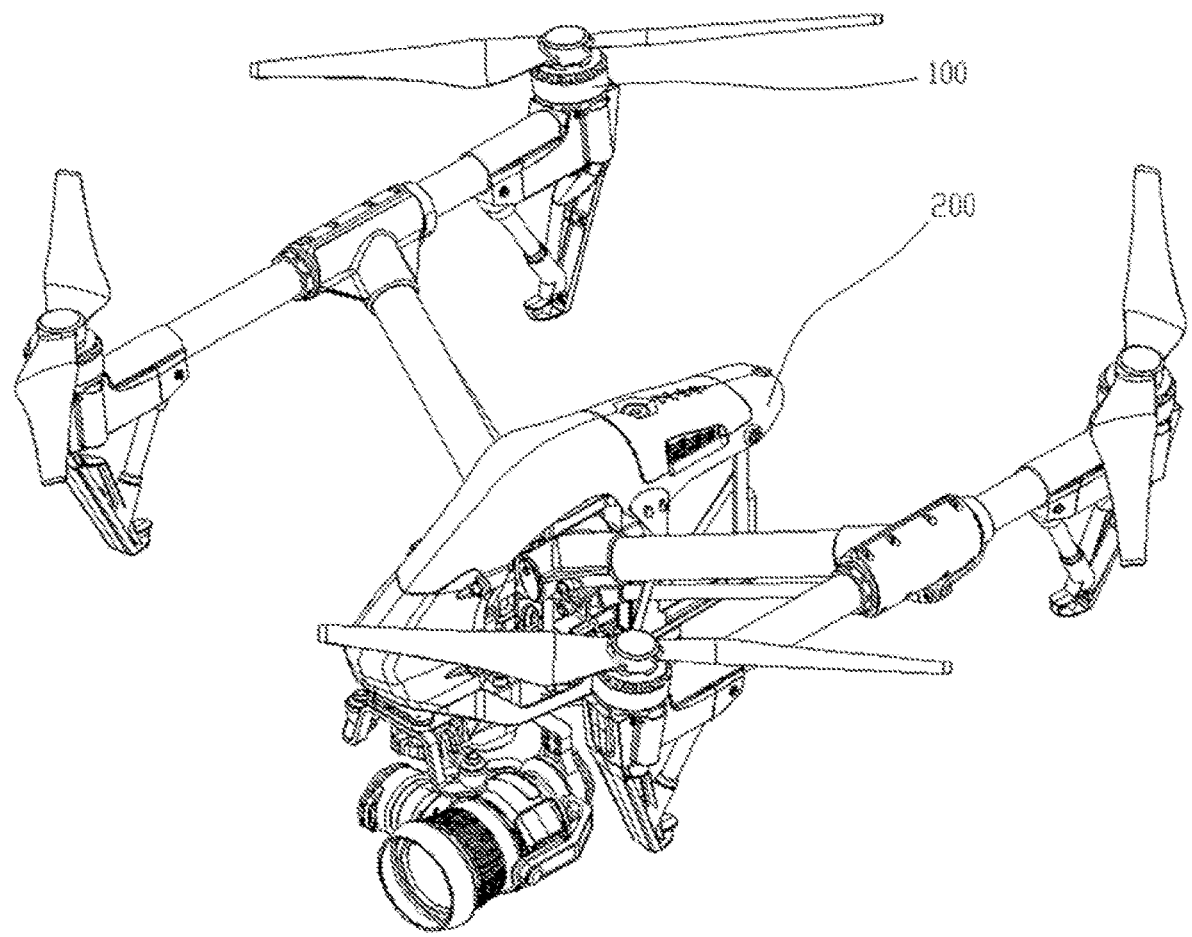
FIG. 13 is a three-dimensional view of an aircraft, according to an example embodiment.

As shown in FIG. 13, an embodiment of the present disclosure provides an aircraft, including an aircraft body 200, a battery installed in the aircraft body 200, and the propulsion system assembly 100 disclosed herein. In some embodiments, the aircraft may be an unmanned aerial vehicle, a remote control airplane, etc.

The aircraft body 200 may be configured for mounting the propulsion system assembly 100. For example, the motor of the propulsion system assembly 100 may be mounted on the aircraft body 200.

The battery may provide electrical energy to the motor of the propulsion system assembly 100.

As shown in FIG. 1, an embodiment of the present disclosure provides a locking mechanism configured to detachably lock the propeller with the motor. As shown in FIG. 1, FIG. 2, and FIG. 8-FIG. 12, the locking mechanism may be configured to detachably connect the first body 1 and the second body 2. It is understood, that in the present disclosure, the first body 1 may be the propeller hub of the propeller, the outer rotor of the motor, or the adapter disposed on the outer rotor of the motor. The second body 2 may be the propeller hub of the propeller, the outer rotor of the motor, or the adapter disposed on the outer rotor of the motor.

The locking mechanism may include the locking member 5 and the position limiting lock catch 6. In some embodiments, the locking member 5 may be configured to lock the first body 1 with the second body 2. The locking member 5 may include locking parts 50 disposed at at least two sides of the locking member 5. When the locking part 50 (or locking parts 50) of the locking member 5 rotates to a locking position (or locking positions), the position limiting lock catch 6 may be mounted to a side of the locking part 50 to restrain the locking member 5 from rotating relative to the first body 1.

The locking member 5 may restrain the first body 1 from separating from the second body 2, thereby reducing the risk of ejecting the blade 7 that is mounted on the first body 1 or the second body 2. Furthermore, by providing locking parts 50 at at least two sides of the locking member 5, the first body 1 may be locked with the second body 2 from at least two locations and/or directions, thereby increasing the reliability of the locking between the first body 1 and the second body 2.

Providing the position limiting lock catch 6 may assist a user in determining whether the locking member 5 has been placed in a locking position, and whether the blade 7 has been installed completely or properly. The disclosed structures may also restrain the locking member 5 from rotating relative to the first body 1 caused by the locking member 5 not being tightly locked, thereby avoiding wear to the locking member 5 that would render the locking member 5 ineffective, which may result in blade ejection.

As shown in FIG. 4 and FIG. 6-FIG. 12, the position limiting lock catch 6 may be detachably mounted to a side of the locking part 50, and may be manually disassembled from the locking part 50. The position limiting lock catch 6 may be independently provided, making it convenient to disassemble and replace.

In some embodiments, the locking member 5 is provided with the position limiting block 57. The position limiting lock catch 6 is provided with the position limiting groove 61 to snap fit with the position limiting block 57. With the snap fit configuration, the position limiting lock catch 6 may have advantages such as convenient installation, simple disassembling, and easy replacement.

To assist a user in determining whether the locking member 5 has rotated to a locking position, and determining whether the blade has been properly installed, the location of the position limiting block 57 does not coincide with the locations of the locking parts 50.

As shown in FIG. 5, the locking part 50 may include a first lock catch end 51 configured to lock the first body 1, and a second lock catch end 52 configured to lock the second body 2. The first lock catch end 51 and the second lock catch end 52 may be located at an upper end and a lower end of the locking part 50, respectively.

The first lock catch end 51 may be configured to lock the first body 1 from the upper portion of the locking part 50. As shown in FIG. 5, the first lock catch end 51 may be provided with a first groove 53. The first body 1 may be provided with a first raised portion to fixedly fit with the first groove 53. When the first raised portion 13 is inserted into the first groove 53, the first raised portion 13 may be fixedly connected with the first groove 53, thereby fixedly locking the first body 1 to the locking member 5. Furthermore, with the fixed fitting configuration, the first raised portion 13 cannot rotate relative to the first groove 53, thereby restraining the locking member 5 from rotating relative to the first body 1, and reducing the wear to the locking member 5 due to rotation. As a result, the operation life of the locking member 5 can be prolonged.

The second lock catch end 52 may be configured to fixedly lock the second body 2 at the lower portion of the locking part 50. As shown in FIG. 5, the second lock catch end 52 may be provided with a second groove 54. The second body 2 may be provided with a second raised portion 21 configured to slidably fit with the second groove 54. By position limiting using the second groove 54 and the second raised portion 21, the second body 2 may be fixedly locked with the locking member 5. As a result, even if the fastener 4 becomes loose and exits completely, by position limiting through the second groove 54, the second groove 54 may tightly pull the second raised portion 21, thereby restraining the locking member 5 from being separated from the second body 2, which in turn restrains the first body 1 from falling apart from the second body 2. In addition, the sliding fit (i.e., the clearance fit) configuration between the second groove 54 and the second raised portion 21 may enable the locking member 5 to rotate relative to the second body 2 after the locking member 5 locks the second body 2. As a result, the locking member 5 may synchronously rotate with the blade 7, thereby restraining the blade 7 from colliding with the locking member 5 during rotation.

In some embodiments, openings of the first groove 53 and the second groove 54 may have opposite directions. The first groove 53 may apply a downward pressing force on the first body 1, and the second groove 54 may apply an upward pulling force on the second body 2, thereby enabling the locking part 50 to lock the first body 1 and the second body 2 more tightly. As a result, blade ejection due to the first body 2 being separated from the second body 1 may be avoided.

Descriptions of other members of the locking mechanism and other members of the position limiting lock catch 6 may refer to the descriptions of FIG. 1-FIG. 12, which are not repeated.

As shown in FIG. 2, an embodiment of the present disclosure provides a propeller, including a propeller hub, a blade 7 connected with the propeller hub, and the locking mechanism disclosed herein. The locking mechanism may be configured to detachably lock the propeller hub to the motor.

In some embodiments, as shown in FIG. 2, the first body 1 may be the propeller hub, and the second body 2 may be an outer rotor of the motor or an adapter provided on the outer rotor of the motor. The adapter may be provided on the outer rotor of the motor, or on a rotating shaft of an inner rotor of the motor. The propeller hub may be detachably mounted to the motor through the locking mechanism disclosed herein.

In some embodiments, the second body 2 is the propeller hub, and the first body 1 is the outer rotor of the motor or the adapter provided on the outer rotor of the motor. The adapter may be provided on the outer rotor of the motor, or fixedly connected to the rotating shaft of the inner rotor of the motor. The propeller hub may be detachably mounted to the motor through the locking mechanism disclosed herein.

As shown in FIG. 1 and FIG. 2, an embodiment of the present disclosure provides a motor, including an outer rotor, an inner rotor, and a locking mechanism disclosed herein. The locking mechanism may be configured to detachably connect the propeller with the outer rotor.

In some embodiments, the first body is the outer rotor or the adapter provided on the outer rotor, and the second body 2 is the propeller hub of the propeller. In the disclosed structures, the adapter may be provided on the outer rotor of the motor or provided on the rotating shaft of the inner rotor of the motor. The propeller may be detachably provided on the outer rotor of the motor through the locking mechanism disclosed herein.

In some embodiments, as shown in FIG. 2, the second body 2 may be the outer rotor or the adapter provided on the outer rotor, and the first body 1 may be the propeller hub of the propeller. In the disclosed structures, the adapter may be provided on the outer rotor of the motor or on the rotating shaft of the inner rotor of the motor. The propeller may be detachably mounted to the outer rotor of the motor through the locking mechanism disclosed herein.

As shown in FIG. 2, an embodiment of the present disclosure provides a propulsion system assembly, including a propeller and a motor configured to drive the propeller to rotate.

The propulsion system assembly 100 may include the locking mechanism disclosed herein.

In some embodiments, the motor may include an outer rotor. The propeller may include a propeller hub and a blade 7 connected with the propeller hub.

In some embodiments, the first body 1 is the propeller hub, and the second body 2 is the outer rotor of the motor, or the adapter provided on the outer rotor of the motor. In the disclosed structures, the adapter may be provided on the outer rotor of the motor, or fixedly connected to the rotating shaft of the inner rotor of the motor.

In some embodiments, the second body 2 is the propeller hub of the propeller, and the first body 1 is the outer rotor of the motor, or the adapter provided on the outer rotor of the motor. In the disclosed structures, the adapter is provided on the outer rotor of the motor, or fixedly connected to the rotating shaft of the inner rotor of the motor.

As shown in FIG. 2-FIG. 4, the motor may include a driving shaft A. The driving shaft A of the motor may protrude from the coupling member 3. The propeller hub may be provided with a driving groove B configured to fit with the driving shaft A to provide a propulsion force.

As shown in FIG. 13, an embodiment of the present disclosure provides an aircraft, including an aircraft body 200, a battery installed in the aircraft body 200, and a propulsion system assembly 100 disclosed herein. In some embodiments, the aircraft may be an unmanned aerial vehicle, a remote control plane, etc.

The aircraft body 200 may be configured for mounting the propulsion system assembly 100. For example, the propulsion system assembly 100 may be mounted on the aircraft body 200.

The battery may provide electrical energy to the motor of the propulsion system assembly 100.

In summary, the present disclosure provides a locking member 5, which can restrain the first body 1 and the coupling member from falling apart from the second body 2 due to the fastener 4 becoming loose. As a result, the risk of blade ejection is reduced for the blade 7 connected to the first body 1 or the second body 2. In addition, the present disclosure provides a position limiting structure of the first body 1 (e.g., a bottom portion of the first body 1 that contacts the coupling member 3) that is configured to block the free end 41 or a position limiting lock catch 6, which can achieve the locking of the first body with the second body from multiple locations and/or orientations, thereby avoiding blade ejection caused by the first body falling apart from the second body.

In the present disclosure, the terms "upper," "lower," "front," "rear," "left," and "right" should be understood as the "upper," "lower," "front," "rear," "left," and "right" directions of the propulsion system assembly 100 that is formed by mounting, from top to bottom, the first body 1, the coupling member 3, and the second body 2.

It should be understood that in the present disclosure, relational terms such as first and second, etc., are only used to distinguish an entity or operation from another entity or operation, and do not necessarily imply that there is an actual relationship or order between the entities or operations. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

The above described embodiments are exemplary embodiments of the present disclosure, and are not intended to limit the present disclosure. All modifications, equivalents, and improvements based on the spirit and principle of the present disclosure should fall within the scope of protection of the present disclosure.

What is claimed is:

1. A propulsion system assembly, comprising:
a propeller;
a motor configured to drive the propeller to rotate,
wherein the propeller comprises one of a first body and a second body,
wherein the motor comprises the other one of the first body and the second body, and
a locking mechanism configured to detachably connecting the first body and the second body, the locking mechanism comprising:
a locking member; and
a position limiting lock catch,
wherein the locking member is configured to lock the first body and the second body,
wherein the locking member comprises locking parts located at at least two sides of the locking member, and
wherein when the locking parts of the locking member rotate to a locking position, the position limiting lock catch is mounted to a side of the locking parts, to restrain the locking member from rotating relative to the first body.

2. The propulsion system assembly of claim 1, wherein the position limiting lock catch is configured to be detachably mounted to the side of the locking parts, and is detachable manually.

3. The propulsion system assembly of claim 2, wherein the locking member is provided with a position limiting block, and
the position limiting lock catch is provided with a position limiting groove configured to snap fit with the position limiting block.

4. The propulsion system assembly of claim 3, wherein a location of the position limiting block on the locking member does not coincide with locations of the locking parts.

5. The propulsion system assembly of claim 2, wherein the locking parts comprise a first lock catch end configured to lock the first body, and a second lock catch end configured to lock the second body.

6. The propulsion system assembly of claim 5, wherein the first lock catch end comprises a first groove, and
the first body comprises a first raised portion configured to fixedly fit with the first groove.

7. The propulsion system assembly of claim 6, wherein the second lock catch end comprises a second groove, and
the second body comprises a second raised portion configured to slidably fit with the second groove, such that the locking member is rotatable with respect to the second body.

8. The propulsion system assembly of claim 1, wherein the motor comprises an outer rotor, and
the second body is the outer rotor of the motor or an adapter provided on the outer rotor of the motor.

9. The propulsion system assembly of claim 8,
wherein the propeller comprises:
a propeller hub; and
a blade mounted to the propeller hub, and
wherein the first body is the outer rotor of the motor or the adapter provided on the outer rotor of the motor.

10. The propulsion system assembly of claim 1, wherein the motor comprises an outer rotor, and
the first body is the outer rotor of the motor or an adapter provided on the outer rotor of the motor.

11. The propulsion system assembly of claim 10, wherein the propeller comprises:
a propeller hub; and
a blade mounted to the propeller hub, and
wherein the second body is the propeller hub of the propeller.

12. The propulsion system assembly of claim 1, wherein the propeller hub comprises a driving groove configured to fit with a driving shaft of the motor.

13. An aircraft, comprising:
an aircraft body;
a propulsion system assembly, comprising:
a propeller;
a motor configured to drive the propeller to rotate; and
a locking mechanism configured to detachably lock the propeller to the motor,
wherein the propeller comprises one of a first body and a second body, and the motor comprises the other one of the first body and the second body, and
wherein the locking mechanism is configured to detachably connect the first body and the second body, the locking mechanism comprising:
a locking member; and
a position limiting lock catch,
wherein the locking member is configured to lock the first body and the second body,
wherein the locking member comprises locking parts located at at least two sides of the locking member, and
wherein when the locking parts of the locking member rotate to a locking position, the position limiting lock catch is mounted to a side of the locking parts, to restrain the locking member from rotating relative to the first body.

14. The aircraft of claim 13, wherein
the locking member is provided with a position limiting block, and
the position limiting lock catch is provided with a position limiting groove configured to snap fit with the position limiting block.

15. The aircraft of claim 14, wherein a location of the position limiting block on the locking member does not coincide with locations of the locking parts.

16. The aircraft of claim 13, wherein
the locking parts comprise a first lock catch end configured to lock the first body, and a second lock catch end configured to lock the second body,
the first lock catch end comprises a first groove, and
the first body comprises a first raised portion configured to fixedly fit with the first groove.

17. The aircraft of claim 16, wherein the second lock catch end comprises a second groove, and the second body comprises a second raised portion configured to slidably fit with the second groove, such that the locking member is rotatable with respect to the second body.

18. The aircraft of claim 13, wherein the motor comprises an outer rotor, the second body is the outer rotor of the motor or an adapter provided on the outer rotor of the motor.

19. The aircraft of claim 18, wherein
wherein the propeller comprises:
a propeller hub; and
a blade mounted to the propeller hub, and
wherein the first body is the outer rotor of the motor or the adapter provided on the outer rotor of the motor, and the second body is the propeller hub.

20. The aircraft of claim 13, wherein
the motor comprises an outer rotor,
the first body is the outer rotor of the motor or an adapter provided on the outer rotor of the motor, and
the propeller hub comprises a driving groove configured to fit with a driving shaft of the motor.

* * * * *